(12) United States Patent
Seltzer et al.

(10) Patent No.: US 8,793,065 B2
(45) Date of Patent: Jul. 29, 2014

(54) ROUTE-BASED ACTIVITY PLANNER

(75) Inventors: Michael Lewis Seltzer, Seattle, WA (US); Neil W. Black, Seattle, WA (US); Jeffrey D. Couckuyt, Bothell, WA (US); Ivan J. Tashev, Kirkland, WA (US); John C. Krumm, Redmond, WA (US); Ruston Panabaker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1423 days.

(21) Appl. No.: 12/033,704

(22) Filed: Feb. 19, 2008

(65) Prior Publication Data
US 2009/0210143 A1 Aug. 20, 2009

(51) Int. Cl.
G06F 17/00 (2006.01)
G06F 19/00 (2011.01)
G01C 21/26 (2006.01)
G01C 21/34 (2006.01)

(52) U.S. Cl.
USPC ........... 701/400; 701/411; 701/423; 701/425; 340/995.14; 340/995.19

(58) Field of Classification Search
USPC ......... 701/200, 201, 202, 208, 209, 210, 211, 701/212, 213, 300, 302, 400, 408, 409, 410, 701/411, 413, 414, 415, 418, 423, 424, 701/425; 340/988, 989, 990, 994, 995.1, 340/995.12, 995.14, 995.16, 995.18, 340/995.19, 995.2
See application file for complete search history.

(56) References Cited

U.S. PATENT DOCUMENTS

| | | |
|---|---|---|
| 4,939,663 A | 7/1990 | Baird |
| 5,187,667 A | 2/1993 | Short |
| 5,422,813 A | 6/1995 | Schuchman et al. |
| 5,504,482 A | 4/1996 | Schreder |
| 5,629,854 A | 5/1997 | Schulte |
| 5,774,073 A | 6/1998 | Maekawa et al. |
| 5,938,720 A | 8/1999 | Tamai |

(Continued)

FOREIGN PATENT DOCUMENTS

| | | |
|---|---|---|
| EP | 1519288 A1 | 3/2005 |
| EP | 1659368 A1 | 5/2006 |

(Continued)

OTHER PUBLICATIONS

MPOS AdSpace http://www.xiam.com/xiam.products.adspace.shtml. Last accessed Oct. 5, 2007, 1 page.

(Continued)

Primary Examiner — Thomas Tarcza
Assistant Examiner — Edward Pipala
(74) Attorney, Agent, or Firm — Dave Ream; Jim Ross; Micky Minhas

(57) ABSTRACT

Oftentimes individuals have a number of objectives to complete while traveling in a vehicle. The objectives can be arranged automatically and an associated route can be produced such that the objectives can be completed in an effective manner. Data related to the objectives can be collected such as a traffic pattern on paths near a location the objective is to take place. Locations for the objectives to be completed can be determined automatically as well as provided by user. Analysis of the collected data can take place and based on a result of the analysis, an efficient route is produced.

20 Claims, 10 Drawing Sheets

(56) References Cited

U.S. PATENT DOCUMENTS

| | | | |
|---|---|---|---|
| 6,119,065 A | 9/2000 | Shimada et al. |
| 6,199,009 B1 | 3/2001 | Meis et al. |
| 6,249,742 B1 | 6/2001 | Friederich et al. |
| 6,253,980 B1 | 7/2001 | Murakami et al. |
| 6,321,158 B1 | 11/2001 | DeLorme et al. |
| 6,339,746 B1 | 1/2002 | Sugiyama et al. |
| 6,374,182 B2 | 4/2002 | Bechtolsheim et al. |
| 6,415,226 B1 | 7/2002 | Kozak |
| 6,470,267 B1 | 10/2002 | Nozaki |
| 6,510,379 B1 | 1/2003 | Hasegawa et al. |
| 6,526,350 B2 | 2/2003 | Sekiyama |
| 6,542,811 B2 | 4/2003 | Doi |
| 6,567,743 B1 | 5/2003 | Mueller et al. |
| 6,622,087 B2 | 9/2003 | Anderson |
| 6,636,145 B1 | 10/2003 | Murakami et al. |
| 6,640,187 B1 | 10/2003 | Chenault et al. |
| 6,697,730 B2 | 2/2004 | Dickerson |
| 6,778,903 B2 | 8/2004 | Robinson et al. |
| 6,785,607 B2 | 8/2004 | Watanabe et al. |
| 6,813,501 B2 | 11/2004 | Kinnunen et al. |
| 6,826,472 B1 | 11/2004 | Kamei et al. |
| 6,847,889 B2 | 1/2005 | Park et al. |
| 6,865,482 B2 | 3/2005 | Hull |
| 6,871,137 B2 | 3/2005 | Scaer et al. |
| 6,898,517 B1 | 5/2005 | Froeberg |
| 6,965,325 B2 | 11/2005 | Finnern |
| 7,016,307 B2 | 3/2006 | Vasudev et al. |
| 7,027,915 B2 | 4/2006 | Craine |
| 7,043,356 B2 | 5/2006 | Linn |
| 7,062,376 B2 | 6/2006 | Oesterling |
| 7,069,308 B2 | 6/2006 | Abrams |
| 7,076,409 B2 | 7/2006 | Agrawala et al. |
| 7,080,139 B1 | 7/2006 | Briggs et al. |
| 7,082,364 B2 | 7/2006 | Adamczyk |
| 7,092,819 B2 | 8/2006 | Odachi et al. |
| 7,103,368 B2 | 9/2006 | Teshima |
| 7,149,625 B2 | 12/2006 | Mathews et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,239,960 B2 | 7/2007 | Yokota et al. |
| 7,250,907 B2 | 7/2007 | Krumm et al. |
| 7,849,031 B2 * | 12/2010 | Stehle et al. | 706/21 |
| 2001/0014849 A1 | 8/2001 | King et al. |
| 2001/0044693 A1 | 11/2001 | Gotou et al. |
| 2002/0004700 A1 | 1/2002 | Klein |
| 2002/0084917 A1 | 7/2002 | Hauptman et al. |
| 2002/0097193 A1 | 7/2002 | Powers |
| 2002/0107027 A1 | 8/2002 | O'Neil |
| 2002/0184091 A1 | 12/2002 | Pudar |
| 2003/0135304 A1 | 7/2003 | Sroub et al. |
| 2003/0158650 A1 | 8/2003 | Abe et al. |
| 2003/0182183 A1 | 9/2003 | Pribe |
| 2004/0076279 A1 | 4/2004 | Taschereau |
| 2004/0088392 A1 | 5/2004 | Barrett et al. |
| 2004/0158483 A1 | 8/2004 | Lecouturier |
| 2004/0233045 A1 | 11/2004 | Mays |
| 2005/0085997 A1 | 4/2005 | Park |
| 2005/0140524 A1 | 6/2005 | Kato et al. |
| 2005/0165762 A1 | 7/2005 | Bishop |
| 2005/0197764 A1 | 9/2005 | Wolf |
| 2005/0216182 A1 | 9/2005 | Hussain et al. |
| 2005/0267651 A1 | 12/2005 | Arango et al. |
| 2006/0058947 A1 | 3/2006 | Schalk |
| 2006/0123053 A1 | 6/2006 | Scannell |
| 2006/0129313 A1 | 6/2006 | Becker et al. |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0241859 A1 | 10/2006 | Kimchi et al. |
| 2006/0241862 A1 | 10/2006 | Ichihara et al. |
| 2006/0247852 A1 | 11/2006 | Kortge et al. |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0061057 A1 | 3/2007 | Huang et al. |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 | 5/2007 | Eichenbaum et al. |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0203644 A1 | 8/2007 | Thota et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0244627 A1 | 10/2007 | Boss et al. |
| 2007/0250259 A1 | 10/2007 | Dare |

FOREIGN PATENT DOCUMENTS

| | | | |
|---|---|---|---|
| WO | WO0002389 A1 | 1/2000 |
| WO | WO0108413 A1 | 2/2001 |
| WO | WO0239367 A1 | 5/2002 |
| WO | WO03019478 A1 | 3/2003 |
| WO | WO03042950 A1 | 5/2003 |
| WO | WO03063521 A2 | 7/2003 |
| WO | WO2004084437 A1 | 9/2004 |
| WO | WO2007131225 A2 | 11/2007 |

OTHER PUBLICATIONS

Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.

Toshihiro Osaragi, et al. Map Element Extraction Model for Pedestrian Route Guidance Map http://ieeexplore.ieee.org/xpl/freeabs_all.jsp?arnumber=1532626. Last accessed Oct. 3, 2007, 10 pages.

S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Ltd. The Netherlands. http://www.pedestrians.tudelft.nl/publications/TR%20B%2004%20rc.pdf. Last accessed Oct. 3, 2007, 22 pages.

Alexandra Millonig, et al. Developing Landmark-Based Pedestrian Navigation Systems, Digital Object Identifier 10.1109/TITS.2006.889439, 1524-9050, IEEE Transactions on Intelligent Transportation Systems, vol. 8, No. 1, Mar. 2007. http://ieeexplore.ieee.org/xpl/freeabs_all.jsp?arnumber=1520046. Last accessed Oct. 3, 2007, 7 pages.

Srihari Narsimhan, et al. Methods for Optimal Pedestrian Task Scheduling and Routing http://www.cs.nott.ac.uk/~rxq/PlanSIG/narasimhan.pdf. Last accessed Oct. 3, 2007, 8 pages.

Gunther Retscher, et al. NAVIO—A Navigation and Guidance Service for Pedestrians. Journal of Global Positioning Systems (2004), vol. 3, No. 1-2: 208-217 http://www.gmat.unsw.edu.au/wang/jgps/v3n12/v3n12p26.pdf. Last accessed Oct. 3, 2007, 10 pages.

About Amaze, 2000-2007 LocatioNet Systems Ltd http://www.amazegps.com/docs/amAze_UM_en%203.1.pdf. Last accessed Oct. 4, 2007, 37 pages.

Route 66 Mobile 7 for Nokia Series 60 Mobile Phones Launched in North America, Dec. 8, 2005, St. Louis, MO. http://www.66.com/route66/news.php?cid=US&sec=0&ssec=9&news=555. Last accessed Oct. 4, 2007, 2 pages.

Vijoy Pandey, et al. Exploiting User Profiles to Support Differentiated Services in Next-Generation Wireless Networks. Jul. 15, 2002 http://networks.cs.ucdavis.edu/~ghosal/Research/publications/vijoy-profiling-network-magazine.pdf. Last accessed Oct. 4, 2007, 23 pages.

(56) References Cited

OTHER PUBLICATIONS

Franziska Klugl, et al. Route Decision Behaviour in a Commuting Scenario: Simple Heuristics Adaptation and Effect of Traffic Forecast. Journal of Artificial Societies and Social Simulation vol. 7, No. 1. Published: Jan. 31, 2004. http://jasss.soc.surrey.ac.uk/7/1/1.html. Last accessed Dec. 11, 2007, 21 pages.

Field Service Route Optimization for Energy and Cost Efficiency http://www.californiagreensolutions.com/cgi-bin/gt/tpl.h,content=381. Last accessed Dec. 10, 2007, 2 pages.

Modelling the impact of incentives on route choice and traffic safety using a route choice simulator experiment http://www.aida.utwente.nl/Nieuws/Vacancy_AIDA-STOK_pilot.whlink/. Last accessed Dec. 10, 2007, 7 pages.

Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425 http://repositories.cdlib.org/cgi/viewcontent.cgi?article=1254&context=its/path. Last accessed Dec. 7, 2007, 48 pages.

Christine M. Johnson. The National ITS Program: Where We've Been and Where We're Going http://66.102.1.104/scholar?hl=en&lr=&q=cachel:flK6zDerzTQJ:plan2op.fhwa.dot.gov/pdfs/Pdf1/Edl03531.pdf. Last accessed Dec. 12, 2007, 12 pages.

Federal Highway Administration FHWA Domestic Pedestrian Safety Scanning Tour, Sep. 2005. http://66.102.1.104/scholar?hl=en&lr=&q=cache:3cGz2QGEKHkJ:www.cdtcmpo.org/bike/pedsafety.pdf. Last accessed Dec. 11,2007, 64 pages.

Lisa J. Molnar, et al. Developing Information Systems for the Driving Tourist: A Literature Review, Feb. 1996. http://66.102.1.104/scholar?hl=en&lr=&q=cache:GJzx9CvxhCQJ:sambuca.umdl.umich.edu:8080/handle/2027.42/1160. Last accessed Dec. 11, 2007, 81 pages.

Martin O'Hara. Automated Congestion Charge Payment Scheme Using Smartnav Intelligent Satellite Navigation System, Apr. 13, 2005. Last accessed Dec. 11, 2007, 7 pages. http://www.tridatacom.co.uk/Downloads/papers/Papers/RIN%20Congestion%20130405.pdf.

James Baring. The Solution to the Traffic Congestion Problem, Dec. 1, 2006. http://revelstoke.org.uk/gsmpccs.htm. Last accessed Dec. 11, 2007, 5 pages.

Atlanta Unveils Traffic Reduction Plan, posted Aug. 28, 2007. http://www.environmentaldefense.org/article.cfm?contentID=6812. Last accessed Dec. 11, 2007, 1 page.

Goncalo Correia, et al. Car Pooling Clubs: Solution for the Affiliation Problem in Traditional/Dynamic Ridesharing Systems http://www.iasi.cnr.it/ewgt/16conference/ID92.pdf. 6 pages.

Pilot Tests of Dynamic Ridesharing, updated Jan. 23, 2007. http://www.ridenow.org/ridenow_summary.html. Last accessed Dec. 11, 2007, 35 pages.

iCarpool http://www.icarpool.com/en/TransportationPlanner.htm. Last accessed Dec. 11, 2007, 2 pages.

Ecolane Dynamic Carpool™, Ecolane Finland Oy 2006. http://www.ecolane.com/services/carpool/index.html. Last accessed Dec. 11, 2007, 1 page.

Route Planner, vol. 3-Modules, (Route Planner—Sep. 6, 2002—LA-UR-00-1767—Transims 3.0). http://ndssl.vbi.vt.edu/Publications/TransimsVol3Ch4.pdf. Last accessed Dec. 11, 2007, 60 pages.

Meredith Williams. Reduce Stress and Stay Organized While Running Errands http://www.microsoft.com/athome/intouch/directions.mspx. Last accessed Dec. 11, 2007, 3 pages.

TomTom Itinerary Planning http://www.gpsreview.net/tomtom-itinerary-planning/. Last accessed Dec. 11, 2007, 12 pages.

Mapquest Business Solutions Advantage APITM http://cdn.mapquest.com/corpb2b/bsolutions-advantageapi-pdf-whitepaper.pdf. Last accessed Oct. 4, 2007, 22 pages.

Route Guidance 'That Won't Replace One Jam with Another', m.logistics, Man/Jun. 2005, Issue 17. http://www.mlogmag.com/magazine/17/route-guidance.shtml. Last accessed Oct. 4, 2007, 3 pages.

New Magellan (Thales) MAESTRO4000 Vehicle Navigation System http://cgi.ebay.com/NEW-MAESTRO4000-Vehicle-Navigation-System-980919-01_W0QQitemZ110163915037QQihZ001QQcategoryZ73332QQcmdZViewItem. Last accessed Oct. 4, 2007, 5 pages.

Moshe Ben-Akiva, et al. Development of a Route Guidance Generation System for Real-Time Application http://rosowww.epfl.ch/mbi/papers/chania.pdf. Last accessed Apr. 10, 2007, 6 pages.

W. -T. Balke, et al. A Situation-aware Mobile Traffic Information System http://www.I3s.de/~balke/paper/hicss03.pdf. Last accessed Apr. 10, 2007, 10 pages.

Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/content/Promo/g3006_07.pdf. Last accessed Oct. 4, 2007, 6 pages.

Alan Mislove, et al. Exploiting Social Networks for Internet Search http://www.mpi-sws.mpg.de/~amislove/publications/PeerSpective-HotNets.pdf. Last accessed Oct. 3, 2007, 6 pages.

Sergi Marti, et al. DHT Routing Using Social Links. http://iptps04.cs.ucsd.edu/papers/marti-social.pdf. Last accessed Oct. 3, 2007, 6 pages.

Antonio Kruger, et al. The Connected User Interface: Realizing a Personal Situated Navigation Service. IUI'04, Jan. 13-16, 2004, Madeira, Funchal, Portugal. ACM 1-58113-815-6/04/0001 www.medien.ifi.lmu.de/pubdb/publications/pub/butz2004userinterface/butz2004userinterface.pdf. Last accessed Oct. 3, 2007, 8 pages.

Managing Demand Through Travel Information Services, U.S. Department of Transportation, Federal Highway Administration http://ops.fhwa.dot.gov/publications/manag_demand_tis/travelinfo.htm. Last accessed Oct. 3, 2007, 33 pages.

Boualem Benatallah, et al. Ocean—Scalable and Adaptive Infrastructure for On-board Information Access, UNSW-CSE-TR-0601, Jan. 2006. http://www.cse.unsw.edu.au/~llibman/papers/unsw601.pdf. Last accessed Oct. 3, 2007, 14 pages.

N. Hristova, et al. Ad-Me: A Context-Sensitive Advertising System http://www.cs.ucd.ie/csprism/publications/Ericsson-UCD/HriAdme01ii.pdf. Last accessed Oct. 3, 2007, 10 pages.

Alessandra Agostini, et al. Integrated Profile Management for Mobile Computing http://webmind.dico.unimi.it/papers/Al2IA.pdf. Last accessed Oct. 3, 2007, 5 pages.

\* cited by examiner

ROUTE-BASED ACTIVITY PLANNER

TECHNICAL FIELD

The subject specification relates generally to traffic routing and in particular, to producing a route based upon activities for completion by a user.

BACKGROUND

Computer-driven route planning applications are utilized to aid users in locating points of interest, such as particular buildings, addresses, and the like. Additionally, in several existent commercial applications, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a municipality, state/providence, and/or country, proximity of the point of interest to major freeways, proximity of the point of interest to a specific city, and the like.

Furthermore, conventional computer-implemented mapping applications often include route-planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she desires to avoid highways. Similarly, a user can inform the route planning application that she wishes to travel on a shortest route or a route that takes a least amount of time (as determined by underlying algorithms). Over the last several years, individuals have grown to rely increasingly on route planning applications to aid them in everything from locating a friend's house to planning cross-country road trips.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventional route generation devices collect user input, such as an intended destination and starting location, and produce a direction set taking a user to the intended destination. Many advanced route generation systems allow a user to input multiple destinations as well as an order in which to complete those destinations. Based upon provided data, the advanced route generation systems provide a direction set to the user allowing her to visit the multiple destinations.

With the disclosed innovation, intended objectives of a user can be analyzed and a route can be provided that enables the user to complete the objectives in an efficient manner. A determination can be made as to how a user should complete the objectives, commonly based upon user history, contextual data, route data, and the like. A variety of checks can take place to ensure that routes are reasonable and provided routes can dynamically alter as a user travels based upon changed conditions.

Conventional thought in route generation circles goes against selecting when a user should complete particular objectives. It is commonly believed that a person is a best party to select when objectives should be completed, so little has been performed toward automatic objective ordering regarding travel routes. Since a person is considered the best party, it would seem illogical to allow an automated decision maker potentially to replace a human with regard to objective planning. However, objectives can be completed with unexpected efficiency if various amounts of data can be quickly analyzed automatically and used in ordering objectives.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
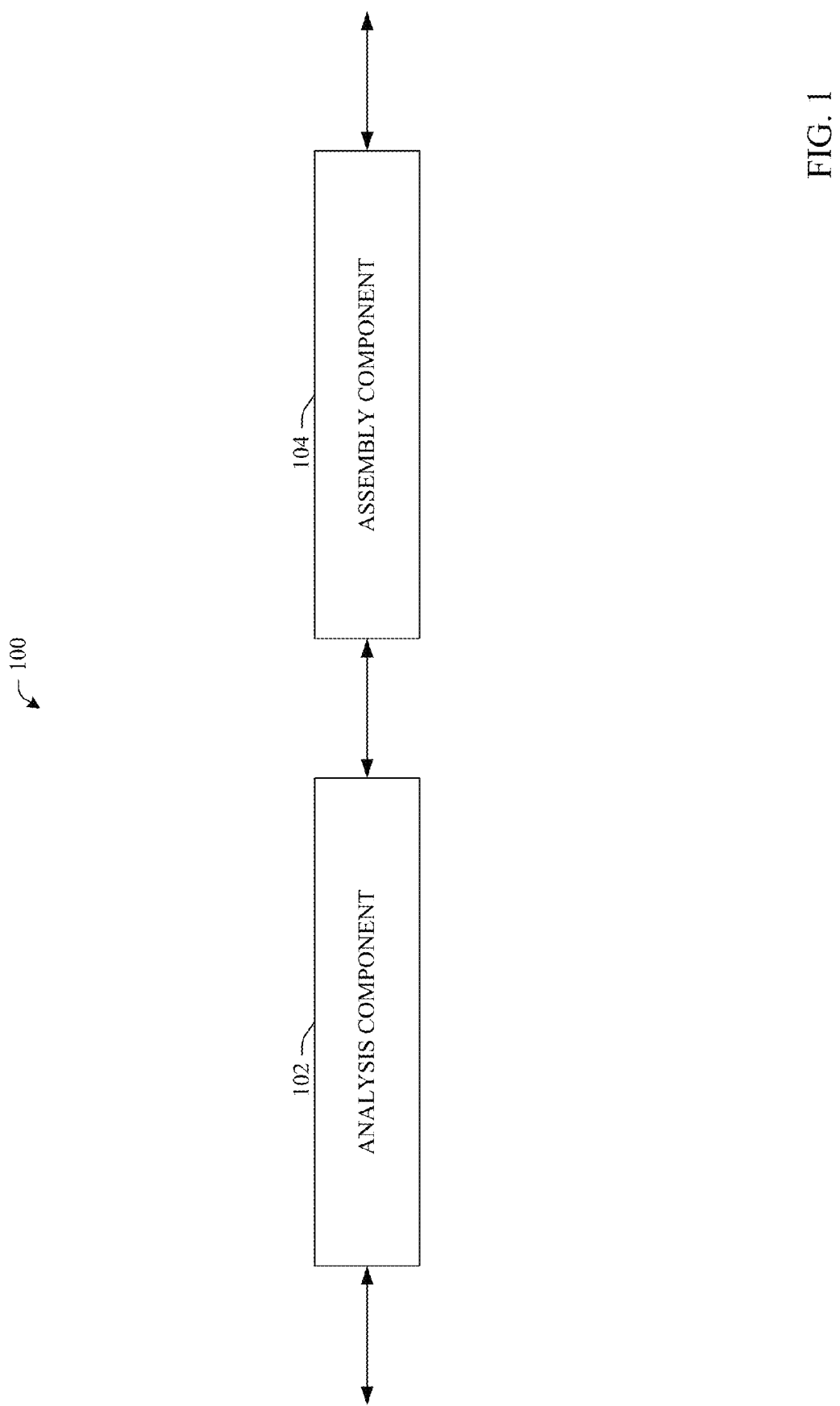
FIG. 1 illustrates a representative system for producing a route that enables a user to complete multiple objectives in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware or a combination of hardware and software. For example, a component can be, but is not limited to being, a process running on a processor, a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, a system 100 is disclosed for producing a route that enables a user to complete at least one objective in an efficient manner. Many individuals travel along a route in order to complete a number of tasks—for instance, on a Saturday afternoon a person could intend to go grocery shopping, retrieve completed dry cleaning, stop at a bank, and have their vehicle washed. The disclosed innovation can analyze objectives of a user and produce a route that enables the user to complete the objectives.

A user can input objectives into the system 100 and data can be collected that relates to the objectives (e.g., a location where an objective can be completed, a route surrounding an objective, and the like). An analysis component 102 can evaluate metadata that concerns at least two objectives. According to one embodiment, a user can explicitly input locations (e.g., to stop at 'Joe's Grocery') as well as make general requests where the system 100 determines a location (e.g., a request to buy cola, but the user does not specify where). Commonly, an objective is a task a user desires to perform or a task where there is an expectation for the user to perform the task. A result of the evaluation can be accessed by an assembly component 104 that produces a travel route as a function of the result of the evaluation of the metadata, the produced route facilitates completion at least one of the objectives. Efficient completion can include completing an objective in a shortest time, shortest distance, safest manner, smallest impact on a desired outcome, or a combination thereof.

The system 100 can operate according to a number of different configurations. In one configuration, a user can request that as many objectives as possible be completed, while some objectives can be mandatory. For instance, a user can go on vacation and input twenty sites to be visited in the system 100, where two of the sites are mandatory (e.g., the route is to have the two sites). The analysis component 102 can evaluate the objectives, path conditions, real time and predicted traffic patterns, and the like. Various determinations and inferences can be made, such as estimating an amount of time the user will spend at individual sites. Based upon the evaluation, the assembly component 104 can produce a route that includes at least some of the objectives including the mandatory objectives. Example criteria that can be used in producing the route can include enabling the user to visit a highest number of sites within a given timeframe, having a user walk a relatively short distance while visiting a relatively large number of sites, having a route that starts and ends at a user hotel room, etc.

However, the system 100 can also configure such that a user provides a list of objectives and the system produces a route that enables the user to complete the objectives in an efficient manner (e.g., a most efficient manner). For example, the user can have the four objectives listed above—go grocery shopping, retrieve completed dry cleaning, stop at a bank, and have their vehicle washed. However, different circumstances can influence how the tasks should be completed. An analysis can take place on a list for grocery shopping—if the list includes ice cream, then it can be inferred that the user should perform this last since ice cream has a tendency to melt while in a vehicle. If the bank is only open during certain hours and the dry cleaning is not anticipated to be ready until a set time, then the analysis component 104 can produce a route such that the user reaches these destinations to complete respective objectives at appropriate times. In addition, the system 100 can manage crowds at locations—if several hundred people are going to a particular grocery store on a personal objective list, a central server can manage the lists such that the people are spaced as to not cause overcrowding at the grocery store (e.g., X number of people are assigned to go to the store every hour). Moreover, a weather forecast can anticipate that there is likely to be rain as a user travels—the wash can be at an end of a route such that if it rains, then the user can choose to eliminate the wash from the trip, thus presumably saving the user time and money. Other criterion can also be used; for example, objectives can be planned in a manner that allows the user to avoid major traffic flow (e.g., toward a downtown area on a Monday morning).

According to one embodiment, at least one of the objectives that have metadata evaluated originates from a primary source and at least one of the objectives that have metadata evaluated originates from a supplemental source. The different sources can be from different locations, such as one objective originating from a file retained upon a user's cellular telephone and one objective originating from a file retained upon a user's laptop computer. However, the different sources can also be from different people, such as on objective to purchase about five items from a store located upon a user's cellular telephone while another about five items from the store are listed as an objective on a cellular telephone of the user's spouse. Additionally, objectives can be shared between parties. For instance, a husband or wife can have an objective to stop at a store to purchase milk—only one of them should make the stop, but it does not matter which one. An evaluation can be made on other objectives for both and based upon the evaluation, a selection can be made on which party is to have a stop for milk included upon a route.

While much of the subject specification discusses personal scenarios, it is to be appreciated that various other implementations can be practiced, such as in a public transit setting or commercial setting. For instance, a public bus can have a request that a route be generated taking the bus past certain stops without regard to when stops occur. As traffic patterns change, the route can be altered to allow the bus to become more effective and potential passengers can be notified of time changes for stops. In addition, a commercial parcel company can have a driver scheduled to perform a number of pick-ups and deliveries. While a driver for the company embarks upon a route, a new pick-up can be added. The system 100 can recalculate the route to include the pick-up, where the re-calculation can enable different objectives to be assigned different times.

Figure 2:
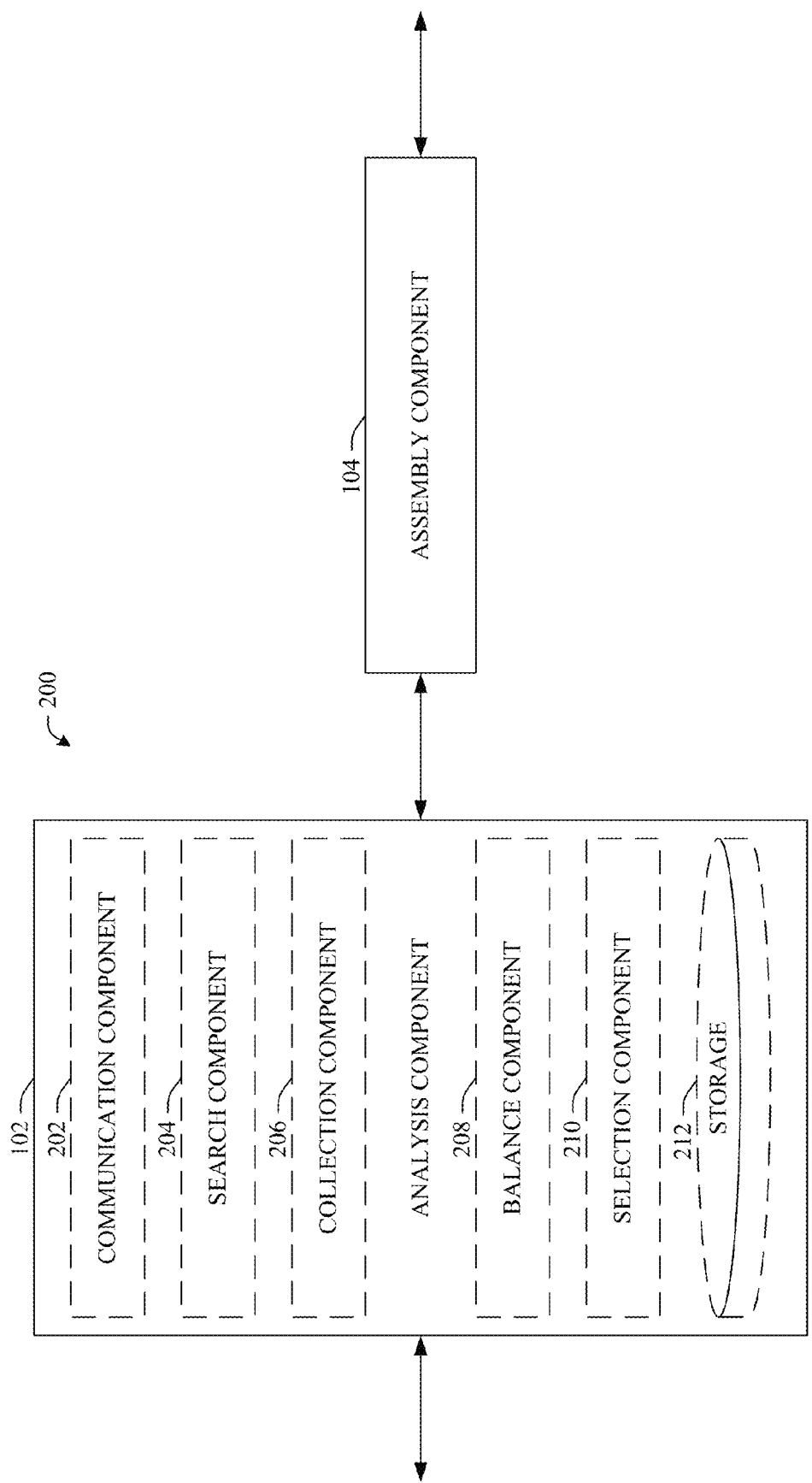
FIG. 2 illustrates a representative system for producing a route that enables a user to complete multiple objectives with a detailed analysis component in accordance with an aspect of the subject specification.

Now referring to FIG. 2, an example system 200 is disclosed for producing a route that enables a user to complete at least one objective in an efficient manner with a detailed analysis component 102. An analysis component 102 can evaluate metadata that relates to an objective a user intends to complete. A communication component 202 can engage with other devices to transfer information, such as to send a request for information, receiving information from an auxiliary source, etc. Operation can take place wirelessly, in a hard-wired manner, employment of security technology (e.g., encryption), etc. Information transfer can be active (e.g., query/response) or passive (e.g., monitoring of public communication signals). Moreover, the communication component 202 can utilize various protective features, such as performing a virus scan on collected data and blocking information that is positive for a virus.

The analysis component 102 can utilize a search component 204 that can locate at least one source of metadata related to the user's objectives. According to one embodiment, the search component 204 can monitor open airwaves to determine if data can be extracted, such as traffic reports of a radio broadcast. In addition, the search component 204 can retain a database of reliable sources and continuously update the database as reliability information is gathered.

A collection component 206 can obtain metadata related to the user's objective where the obtained metadata is evaluated, oftentimes from at least one source located by the search component 204. It is possible that such a large amount of information can be gathered that it can be beneficial for filtering to take place. The collection component 206 can filter out obtained data that is not from select sources (e.g., reliable sources), blocking data determined irrelevant from other components, as well as other filtering configurations.

Different objectives of a user can have different priorities and a balance component 208 can weigh priority of at least two objectives, priority of the at least two objectives is taken into account in the travel route production. For instance, meeting a user's children after school can be considered highly important while stopping at a video rental store can be considered desirable, but not important. The balance component 208 can determine how important objectives are to a user, where the determination can be used in route production. The balance component 208 can infer priorities for objectives of a user as well as have a user explicitly provide task priorities.

Some objectives can be considered necessary while others are optional—a selection component 210 can choose at least one objective upon which completion is facilitated. Commonly, the selection component 210 can choose objectives based upon weight factors, traffic patterns, projected user safety, time, weather, and the like. According to one embodiment, the selection component 210 chooses all the objectives entered by a user automatically. According to one embodiment, a user can have no desire to see any particular objectives, but to have a route taking the user past particular sites. For instance, a user can be at a business conference where she has the afternoon off with no planned activities. The user can make a request to the system 200 stating, "in the next 4 hours, I want to visit as many interesting sites as possible within walking distance from my hotel room." An analysis of user preferences, tourist attractions, traffic patters, and the like can be performed and based upon the analysis a route can be produced taking the user past various attractions. As the user travels along the route, the system 200 can gain feedback to the route and make modifications to the route in real time. For instance, if a user did not like a first attraction along the route, then the route can be modified to exclude similar attractions.

Different pieces of information, such as collected materials, component operating instructions (e.g., of the search component 204), source location, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a Redundant Array of Independent Drives configuration). Storage 212 can retain a cache of secondary objectives that are to be completed when possible. For instance, a user can desire to have his haircut, but not care when the haircut takes place. When there is availability for an objective located in the cache to take place (e.g., as a function of user time, availability, location, and the like), the objective can be incorporated upon the route. An assembly component 104 can produce a travel route as a function of a result of the evaluation of the metadata, the produced route facilitates completion at least one of the objectives.

Figure 3:
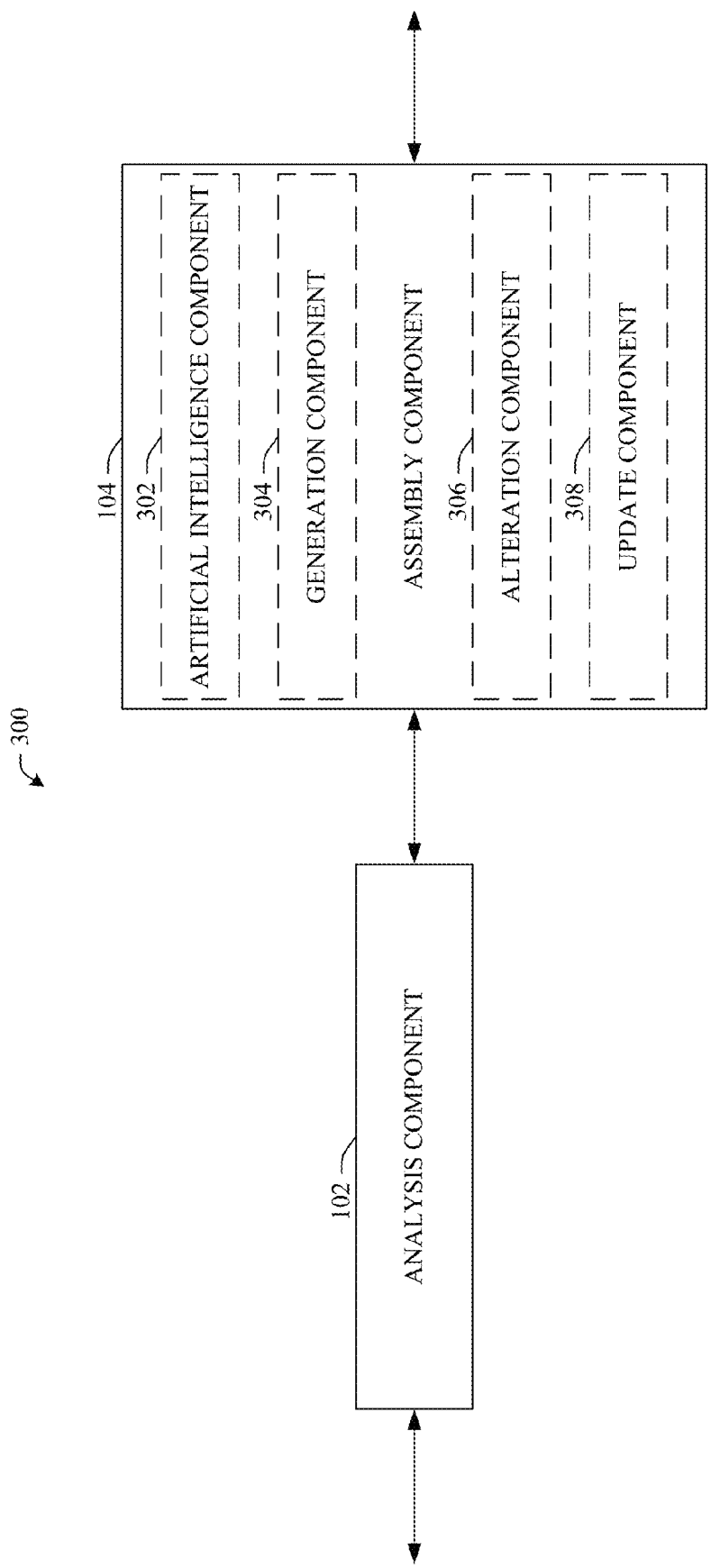
FIG. 3 illustrates a representative system for producing a route that enables a user to complete multiple objectives with a detailed assembly component in accordance with an aspect of the subject specification.

Now referring to FIG. 3, an example system 300 is disclosed for producing a route that enables a user to complete at least one objective in an efficient manner with a detailed assembly component 104. An analysis component 102 can evaluate metadata that concerns at least two objectives. A result of the evaluation can transfer to the assembly component 104 that produces a travel route as a function of the result of the evaluation of the metadata, the produced route facilitates completion of at least one of the objectives.

At least one inference or at least one determination in regard to the metadata evaluation or the travel route production can be made by an artificial intelligence component 302. For instance, it can be inferred that a stop for fuel along a road is an important objective when a vehicle a user is traveling upon is low on fuel. Moreover, a determination can be made such as that when a user states 'stop for food' and the user has a grocery list scanned that the user intends to go grocery shopping and not to stop for a meal.

The artificial intelligence component 302 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

A standard route can be outputted by a generation component 304 (e.g., a route from a start location to an end location). An alteration component 306 can modify the standard route such that objectives can be completed. For instance, a standard route can lead a user from her home to an off-site business meeting location. The user can inform the system 300 that she has objectives to stop for fuel and for breakfast before her meeting. The system 300 can determine locations for the user stated objectives to take place and the alteration component 306 could modify the standard route to include paths to appropriate locations. Thus, through utilization of the alteration component 306, the assembly component 104 can alter an available route as a function of a result of the evaluation to produce the travel route, the altered route facilitates completion at least one of the objectives.

However, in another configuration, the system 300 can generate a route that includes at least one objective without reliance on an existing and/or standard route. A user can make a request to the system 300 that he wants to stop to buy food and stop for a magazine prior to attending a play. The system 300 can determine that the user does not have time for both objectives if he wants to be at the play at starting time and that a route should be produced that includes stopping for food. A route can be constructed that takes a user to a restaurant and the user is informed that a stop for the magazine is considered unfeasible. Thus, through utilization of the generation component 304, the assembly component 104 can generate the travel route as a function of a result of the evaluation of the metadata, the produced route facilitates completion at least one of the objectives.

As the user travels along the route, circumstances can change that influence objective completion. In an illustrative example, a route can be produced that enables the user to complete objectives in a shortest time based upon estimated traffic patterns. However, an unexpected accident can occur that drastically alters an actual traffic pattern against estimated traffic patterns and thus the produced route no longer takes the shortest time. An update component 308 can monitor the route as well as other data and make changes to the route (e.g., through utilization of the alteration component 306) based upon impacting circumstances. The update component 308 can modify the produced travel route based upon a change in the analyzed metadata used to produce the route, the produced travel route can facilitate a most efficient completion of at least one of the objectives and the change in the analyzed metadata is sufficient to convert the produced route from most efficient to non-most efficient.

Figure 4:
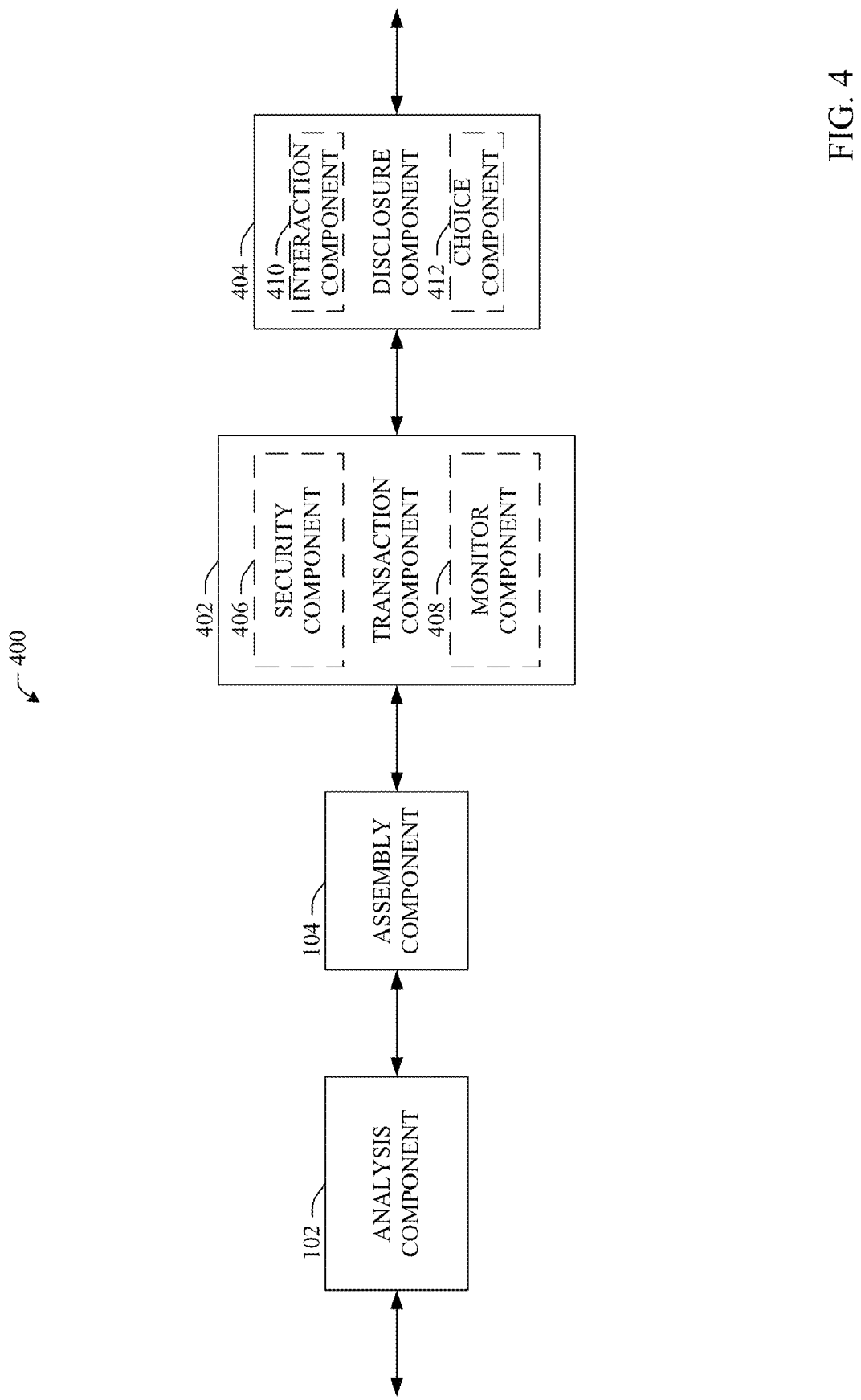
FIG. 4 illustrates a representative system for producing a route that enables a user to complete multiple objectives with various components that enhance system functionality in accordance with an aspect of the subject specification.

Now referring to FIG. 4, an example system 400 is disclosed for producing a route that enables a user to complete at least one objective in an efficient manner with a detailed transaction component 402 and disclosure component 404. An analysis component 102 can evaluate metadata that concerns at least two objectives. Access to the evaluation result can be provided to an assembly component 104 that produces a travel route as a function of a result of the evaluation of the metadata, the produced route facilitates completion of at least one of the objectives.

A transaction component 402 can perform a financial operation based on the metadata evaluation or the travel route production. A user can pay money to have their objectives planned, be paid money to let a general server dictate their route, and so forth. The transaction component 402 can perform actions to meet constraints, such as debiting a user account and crediting a provider account. While fiscal amounts are commonly transacted, it is to be appreciated that other commodities can be exchanged, such as coupons, meeting of contractual obligations (e.g., canceling of a task to be performed), tax credits, etc.

Moreover, a financial operation can take place in relation to user response to a commercial detail (e.g., advertisement along an alternate route). For example, an advertisement can be displayed with a produced route that a user should stop at a highway exit for a cup of coffee (e.g., a stop to meet an objective, a non-objective stop, etc.). If the user takes the exit, buys the cup of coffee, buys a different item, etc., then payments of varying amounts can be made to an advertisement hosting service.

A security component 406 can regulate operation of the transaction component 402. Oftentimes, the transaction component 402 can transfer funds from a banking account of a company to an account of a user. Since this can be considered sensitive information, the security component 406 can protect this transfer through implementation of encryption, password protection, and the like. Moreover, the security component 406 can check financial operations for consistency and perform correction operations. If a wrong amount of money is sent from one party, then the security component 404 can identify an error and send notice that a different amount should be sent.

Oftentimes, to earn a reward a user is expected to perform a specific action (e.g., making a stop at an advertised location). A monitor component 408 can observe actions pertaining to the system 400, such as where a user travels, if a user leaves a vehicle operating the system 400, if a user makes a purchase, if a company performed in an agreed manner, and the like. The monitor component 408 can compare observed actions against transactional criteria to determine if a financial operation is proper to occur. Based upon a result of the comparison, the monitor component 408 can regulate operation of the transaction component 402.

A disclosure component 404 can provide the produced route to a user (e.g., a vehicle passenger or operator, as a pedestrian, etc.). A non-exhaustive list of disclosure components include a display screen, touch screen, speaker system, virtual reality environment, Braille production system, printer, etc. In addition, the disclosure component 404 can present information in multiple formats, such as showing a video with audio capabilities.

Moreover, the disclosure component 404, as well as other components disclosed in the subject specification can implement upon a personal electronic device (e.g., cellular telephone, personal digital assistant, etc.), upon a vehicle (e.g., automobile, motorcycle, bicycle, airplane, helicopter, motorboat, self-balancing transportation device, etc.), etc. An interaction component 410 can be used to facilitate obtainment of the metadata that concerns at least two objectives from a user. Commonly, the interaction component 410 can implement as a touch screen, a keyboard, microphone, and the like. The disclosure component 404 can configure to present one or more travel routes to a user with context of what objectives are met by taking the one or more travel routes and the user can select one of the travel routes to follow. The user can select one of the presented travel routes through engaging the interaction component 410, selection of the route presents more detailed information of the route than what is initially presented.

Information that is to be presented to the user in addition to the produced route can be regulated by a choice component 412. A relatively large amount of information can be provided to the user with the route, such as why objectives were selected, why an order is used, traffic information, and the like. However, so much information could be presented that the user could become confused, accurate display can become impractical, and the like. The choice component 412 can determine information that can be beneficial to the user and instruct the disclosure component 404 to present the determined information.

Figure 5:
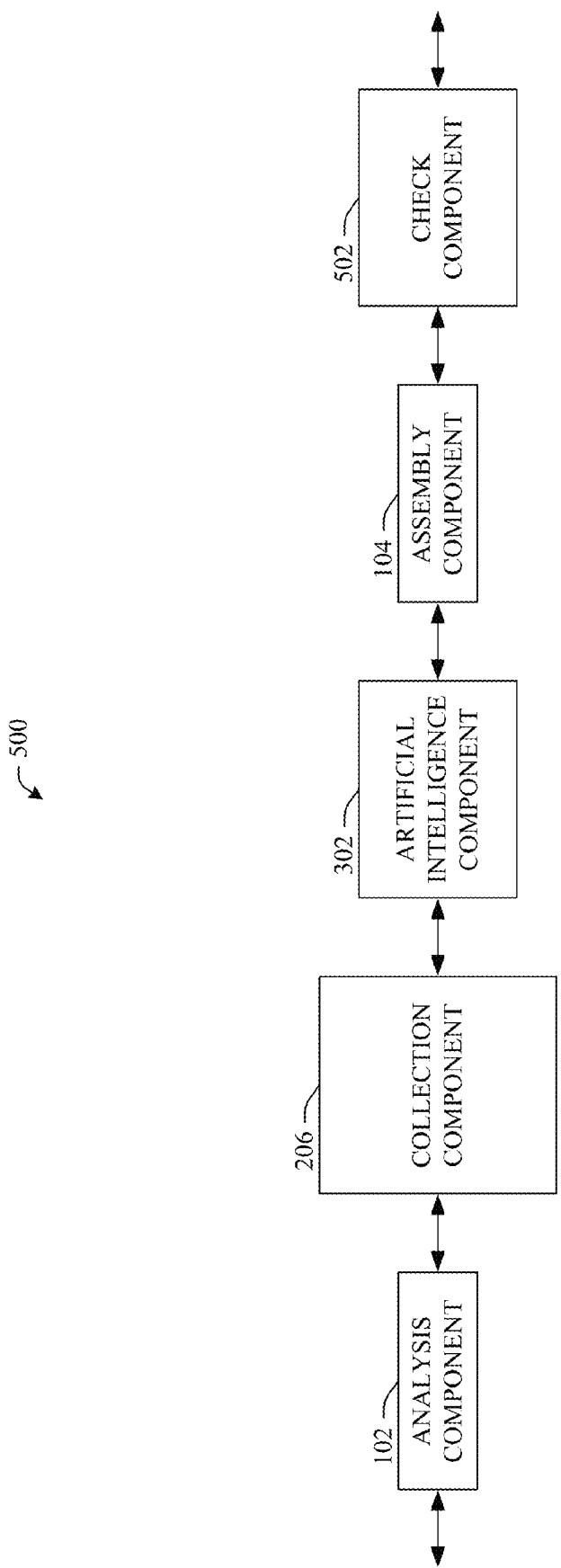
FIG. 5 illustrates a representative system for producing a route that enables a user to complete desired objectives in accordance with an aspect of the subject specification.

Now referring to FIG. 5, an example system 500 is disclosed for arranging objectives of a user in an efficient manner. A user can enter objective information to the system 500 (e.g., through utilization of the interaction component 410 of FIG. 4), objective data can be inferred (e.g., through conventional pre-determination techniques, such as examining user history), and the like. An analysis component 102 can evaluate the objectives in view of a manner in which the system 500 can produce an efficient route. The analysis component 102 can operate as a means for evaluating at least two activities slated for performance by a user.

Based upon an evaluation of the objectives, a collection component 206 can gather data that pertains to objectives analyzed. Typically, the collection component 206 selectively obtains information, where selection is based on taking data from trusted sources, gathering timely details, and the like. The collection component 206 can function as a means for collecting metadata related to the at least two activities and mapping information.

Commonly, based upon at least a portion of the collected information, an artificial intelligence component 302 can determine an order for objective completion. This can be a most effective order of completing objectives, an effective order of completing objectives, an order for objection completion that does not take effectiveness into account, and the like. The artificial intelligence component 302 can implement as a means for determining a most effective manner in which to complete the at least two activities, the determination is based upon at least a portion of the collected metadata.

Based upon the determined order for objective completion, an assembly component 104 can construct or modify a direction set a user can follow to complete the objectives. According to one embodiment, a general route is produced for completing objectives initially and the general route is altered to improve effectiveness toward objective completion. The assembly component 104 can function as a means for producing a direction set, such that following the direction set enables the user to complete the activities in the determined most efficient manner.

It is possible that an objective be dependent upon another objective—for instance, if a first objective is to pick children up at school and a subsequent objective is to drop the children at baseball practice, then it would be illogical to perform the second objective before the first since until the first objective is complete there are no children to drop. A check component 502 can verify that a route to complete objectives does not have a dependency error (e.g., a dependent objective is not preformed prior to its necessary objective) and indicate to components that corrections are to occur—notified components can made appropriate changes. While disclosed operating after the assembly component 104, it is to be appreciated that operation of the check component 502 can take place in other contexts consistent with the subject specification, such that an immediate check occurs once objectives are ascertained. The check component 502 can operate as a means for verifying that the most effective manner is feasible, if the most effective manner is not feasible, then the means for determining a most effective manner reiterates operation in view of a result of the verification.

Figure 6:
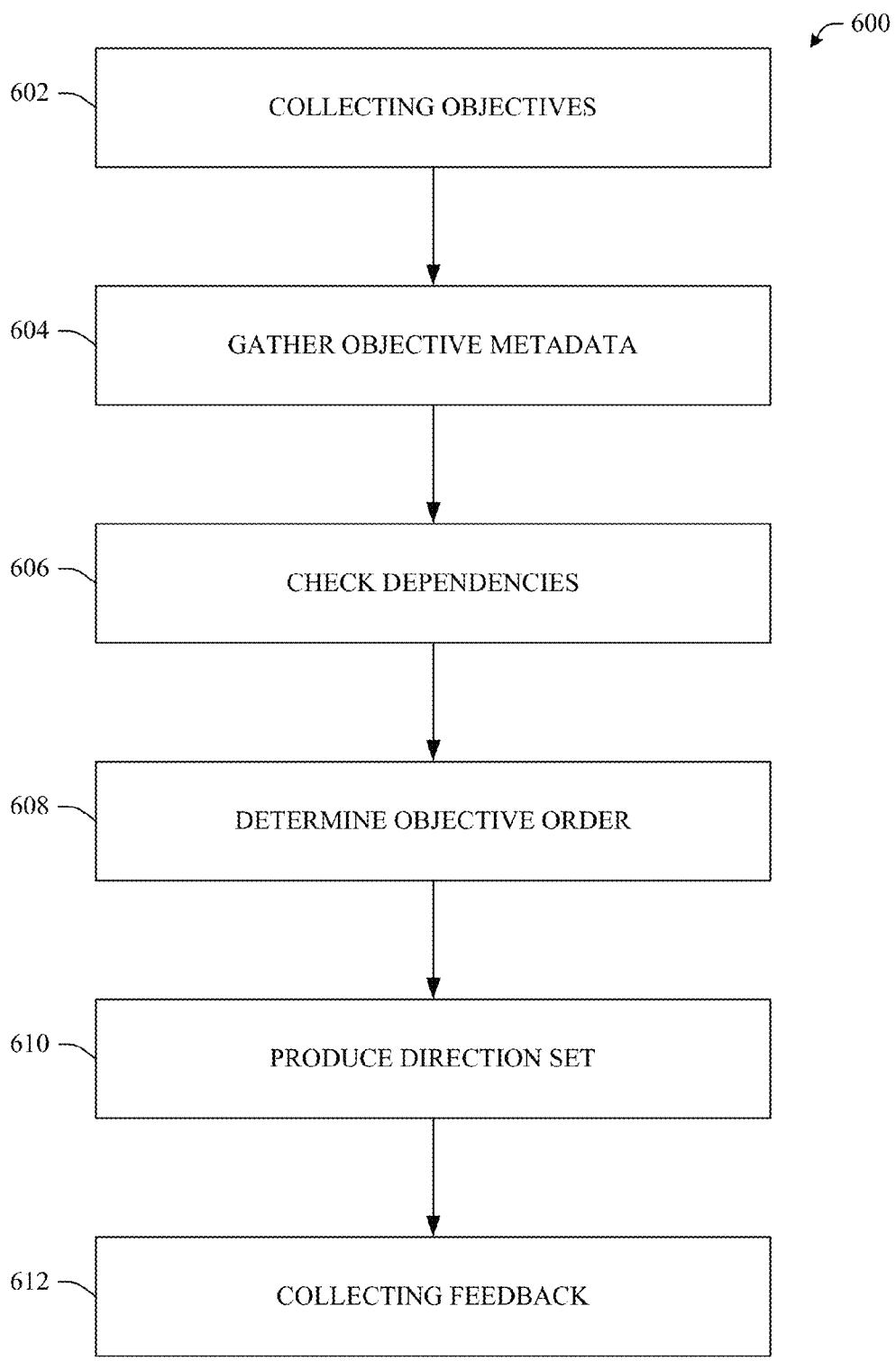
FIG. 6 illustrates a representative methodology for producing a route that enables a user to complete objectives in accordance with an aspect of the subject specification.

Now referring to FIG. 6, an example methodology 600 is disclosed for producing a direction set that enables a user to complete objectives. At block 602, objectives for at least one user can be obtained. Commonly, a user can enter objectives, such as scanning an objective list into a computer. However, objectives can also be determined and/or inferred—for instance, at 8AM on a Monday an objective can be inferred based on history that a user intends to travel to her office.

Metadata that relates to the collected objectives can be gathered at action 604. If an objective is indirect (e.g., a task for completion without a specific location, such as stopping for fuel), then data concerning potential locations can be retrieved. For an indirect objective and direct objective (e.g., a user specifies a task to be done at a location), various types of data can be gathered, such as contextual location information, traffic reports of various paths, and the like.

A determination can be performed at action 606 if objectives are dependent upon other objectives, contextual occurrences, and the like. For example, one objective can be required to be completed before another objective (e.g., gathering unclean clothing at a house before driving to a washing machine to clean the clothing). In addition, certain contextual dependencies can exist, such as if a store is open certain hours, a desire to avoid heavy traffic, and the like.

An order for completion of the objectives can be determined at event 608. This can include ensuring that dependencies are followed as well as an attempt to create an efficient direction set for a user. Event 608 can include determining an efficient order to complete at least two travel objectives automatically. Oftentimes the determination of order is based upon the gathered objective metadata, such as when traffic patterns are anticipated to be severe. The efficient order can include completing the at least two travel objectives in a shortest time, shortest distances, safest manner, smallest impact on a desired outcome (e.g., use lowest fuel), or a combination thereof A direction set can be produced at action 610, oftentimes utilizing the order determined at event 608. Analysis can occur of mapping data as well as metadata related to the objectives. Based upon the analysis, a turn-by-turn arrangement can be made that enables the user to complete the objectives by following the arrangement. For instance, a user can be visiting a college campus as a prospective student and desire to view specific locations. The user can list dormitories and eating facilities as high priorities, while athletic facilities and popular off-campus locations can be labeled as optional. In addition, inferences can be made, such as if a user is planning on majoring in art, then a building dedicated to a college art department can be labeled as a high priority. Based upon the analysis, the objectives can be ranked (e.g., numerically, as high/low, and the like) and transferred to the college so a personalized tour can be made. Action 610 can implement as producing a direction set that enables a user to complete the at least two travel objectives in the efficient order.

Feedback can be gathered as to the effectiveness of the produced direction set at event 612. Changes can be made on how to determine objective order based upon the collected feedback. For instance, user feedback on a direction set can be collected and used to modify different aspects disclosed in the subject specification, such as altering how inferences are made.

Figure 7:
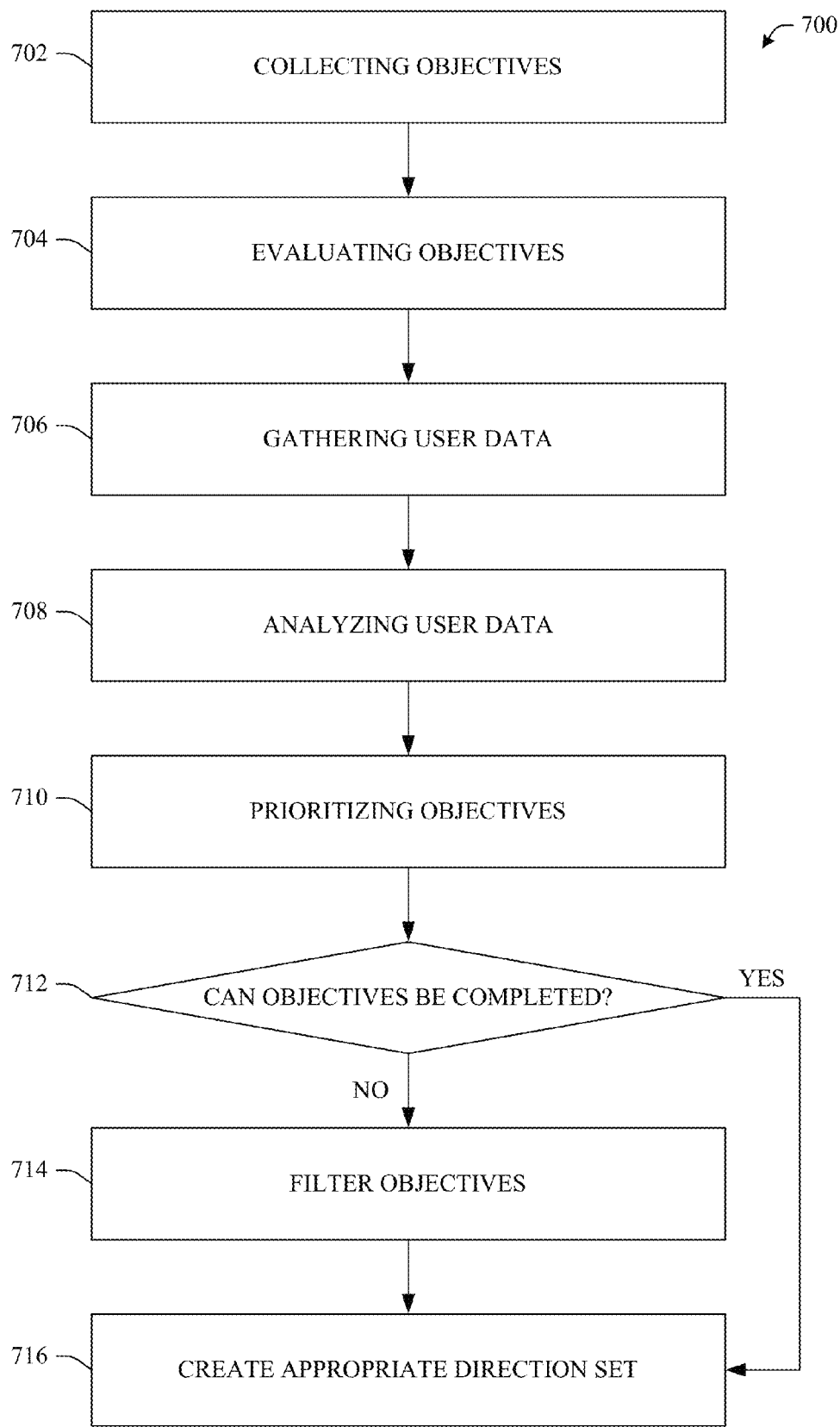
FIG. 7 illustrates a representative methodology for processing multiple objectives into a route in accordance with an aspect of the subject specification.

Now referring to FIG. 7, an example methodology 700 is disclosed for producing a route designated to facilitate objective completion. At event 702, objectives for at least one user can be collected. Commonly, a user can input objective information, such as reading a list into a digital unit. However, objectives can also be determined and/or inferred—for instance, if a vehicle is low on fuel, than an objective can be inferred that a user should stop at a fuel station.

The collected objectives can be evaluated at action 704. Evaluation of the objectives can include making inferences based upon user instructions (e.g., if a user says 'stop at fast food drive-through', then an inference can be drawn that the user wants to stop as well as purchase food.) During the evaluation, metadata that relates to the objectives can be gathered and analyzed, such as hours of operation for locations, traffic patterns, and the like.

User data, including user data that pertains to the collected objectives, can be gathered through event 706. A storage unit can retain a user profile based upon observations, user history, and the like. The profile can be accessed to ascertain anticipated user preferences. In addition, a user can be explicitly asked to provide specific data, such as to order the objectives based upon priority, to provide objective level (e.g., label objectives as 'necessary' or 'optional'), etc.

The user data can be analyzed at act 708, commonly in light of the collected objectives and based upon the analysis, the collected objectives can be prioritized at event 710. Event 710 can implement as determining an efficient order to complete at least two travel objectives automatically. A check 712 can take place determining if all the objectives of the user can be completed. There can be various reasons that not all objectives can be completed. For instance, certain events can take place a concurrent time, the requiring selection of one objective. However, it is also possible that constraints can be placed that limit objective completion, such as that objectives are to be completed in a time (e.g., within eight hours).

If it is determined at the check 712 that the objectives cannot be completed reasonably, then objectives can be filtered out at event 714. Determining objectives to be filtered out/kept can be performed based on various criteria. For instance, lowest prioritized objectives can be eliminated until a reasonable number remain. In addition, algorithms can be used balancing a user's interest against other factors—for example, an inference can be drawn that it would be better for a user to complete about four 'medium' rated objectives rather than about one 'high' rated objective.

With a determined set of objectives, an appropriate direction set can be created at event 716. The direction set can be created in accordance with user constraints gathered at event 706 (e.g., complete objectives in a shortest time). Event 716 can include producing a direction set that enables a user to complete the at least two travel objectives in the efficient order.

Figure 8:
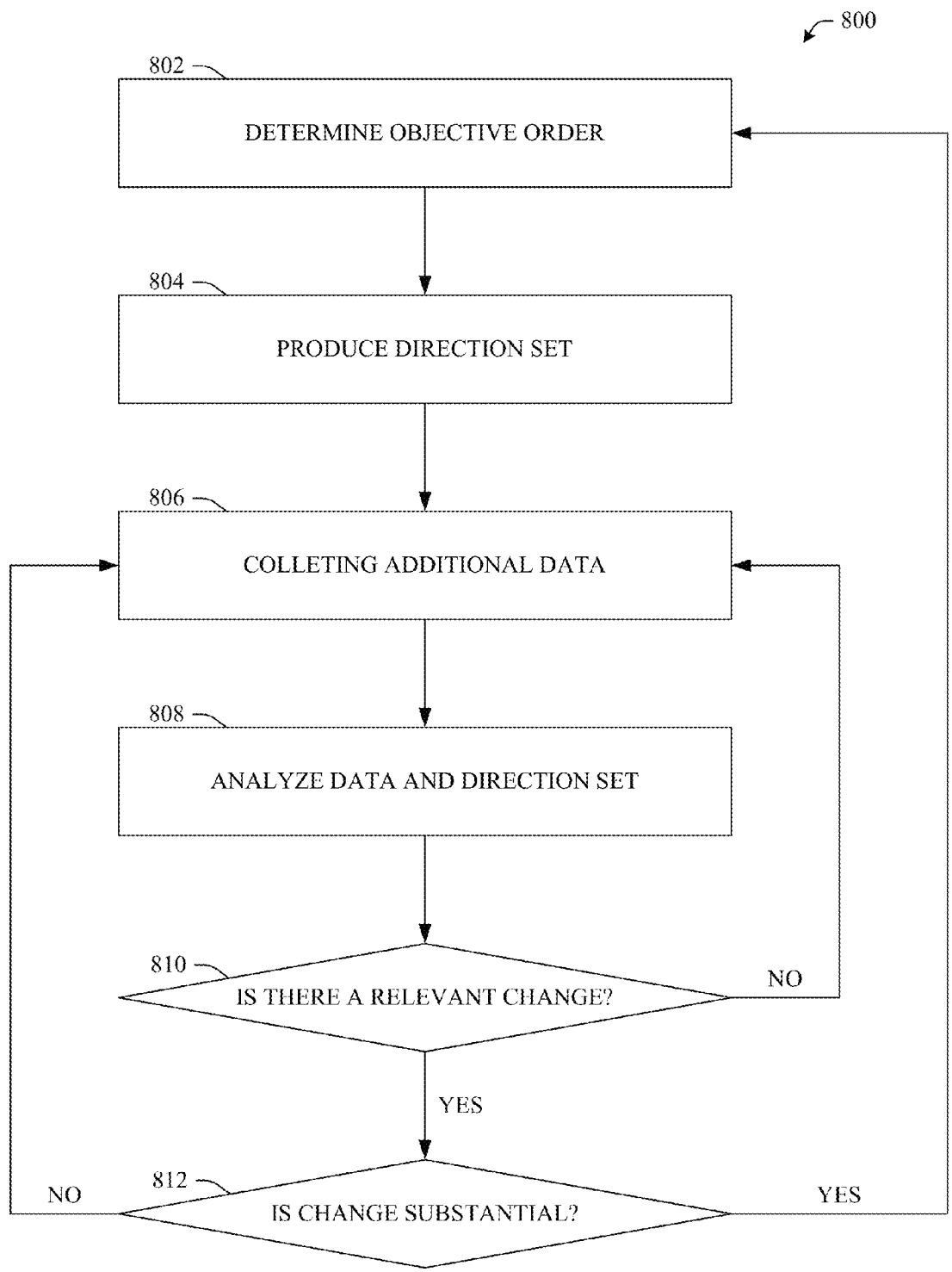
FIG. 8 illustrates a representative methodology for altering a direction set based upon a change in objective metadata in accordance with an aspect of the subject specification.

Now referring to FIG. 8, an example methodology 800 is disclosed for monitoring and updating a direction set designed to facilitate user completion of objectives. At act 802, an order for objectives to be completed can be determined. Act 802 can include determining an efficient order to complete at least two travel objectives automatically.

Based upon the objective order, a direction set can be produced through action 804. Production of the direction set can include creating a new direction set, modifying an existing direction set, and the like. Action 804 can include producing a direction set that enables a user to complete the at least two travel objectives in the efficient order.

Additional data (e.g., new data, modified data, newly learned data characteristics, etc.) that pertains to the produced direction set can be collected at event 806. Commonly, the data that is collected relates to the direction set and/or objectives. For instance, traffic patterns can be used to produce the direction set at action 804. As the traffic patterns change, data that pertains to the changed data can be gathered.

The gathered data can be analyzed at act 808 in addition to analyzing the produced direction set, which can be performed in a manner consistent with other aspects disclosed in the subject specification. A check 810 can occur to determine if a relevant change occurs with regard to at least one objective. Various data changes can influence how a route implements—example changes include alteration of data that is used in producing a route, newly discovered information, data determined to be inaccurate, and so forth. If there is not a relevant change, the methodology 800 can continue collecting additional data.

If there is a change considered relevant, then a check 812 can take place to determine if the change is substantial. For example, it can be determined that a road with heavy traffic that is initially avoided has become even more difficult to traverse. Since this route is already avoided, it is likely more traffic is not substantial to influence the route, so the methodology 800 can return to collect more data. However, if a path becomes less congested, then it is possible that a different path should be used. The methodology 800 can return to act 802 so a determination can be made if a different route should be produced (e.g., the produced route should be modified to include the discussed path).

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device or media.

Figure 9:
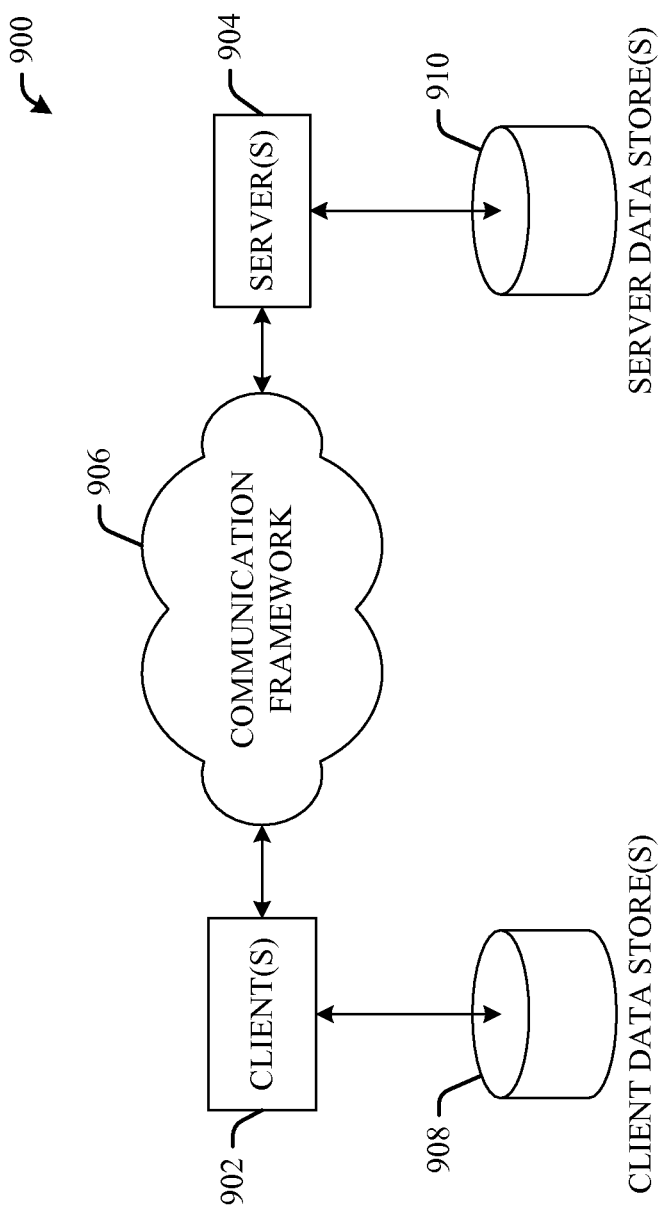
FIG. 9 illustrates an example of a schematic block diagram of a computing environment in accordance with an aspect subject specification.
Figure 10:
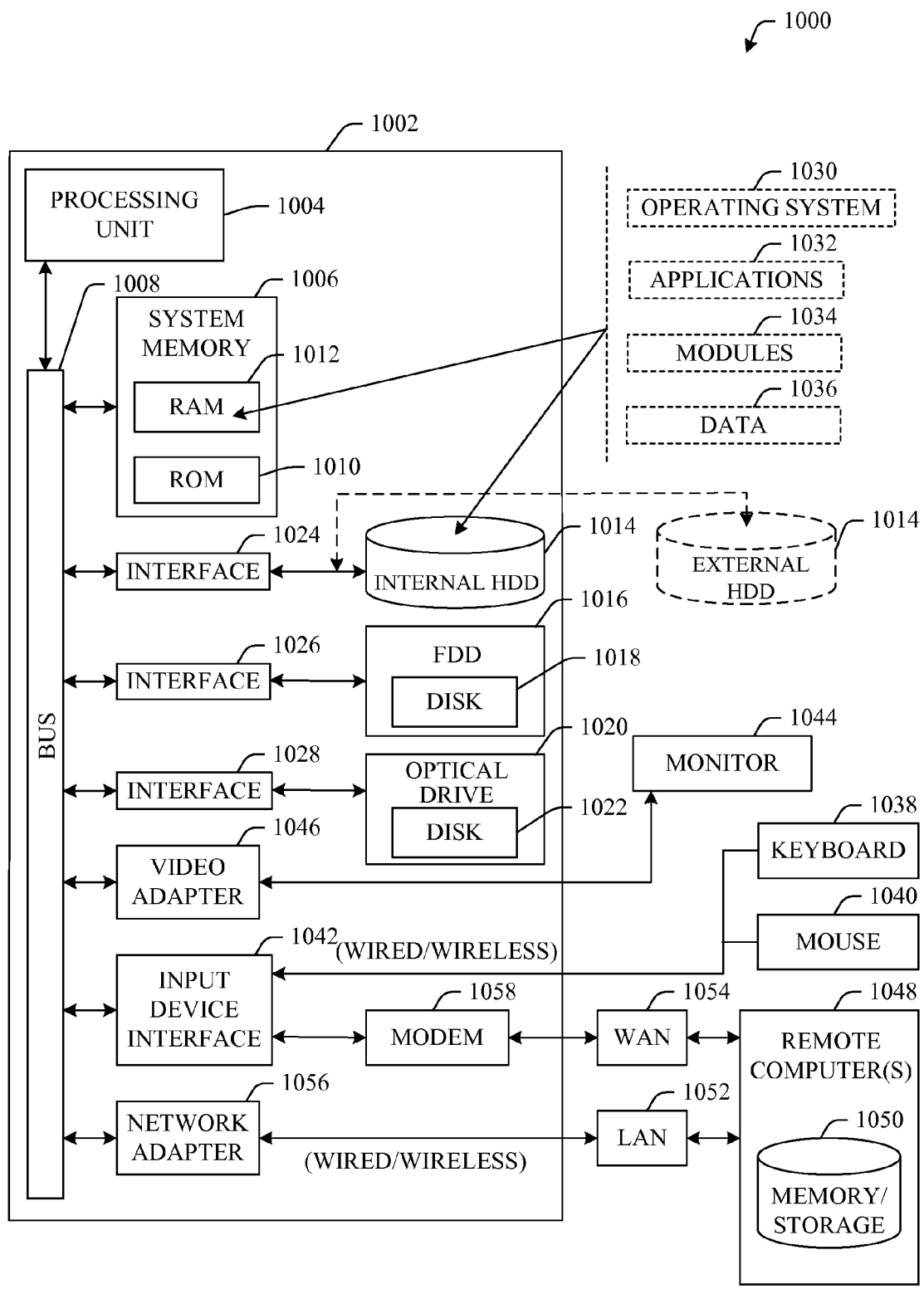
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware or a combination of hardware and software (e.g., threads, processes, computing devices). The client(s) 902 can house cookie(s) and/or associated contextual information by employing the specification, for example.

The system 900 also includes one or more server(s) 904. The server(s) 904 can also be hardware or a combination of hardware and software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented at least in part via a processing unit comprising:
receiving at least two objectives;
receiving an allotment for completing the at least two objectives, the allotment comprising at least one of:
a time allotment for completing the at least two objectives, or
a distance allotment for completing the at least two objectives;
determining that a first objective of the at least two objectives cannot be completed within the allotment; and
generating a first route for navigating a user to a second location for completing a second objective of the at least two objectives while not navigating the user to a first location for completing the first objective due to determining that the first objective cannot be completed within the allotment.

2. The method of claim 1, comprising updating the first route to generate a second route in real-time based upon feedback from the user.

3. The method of claim 1, comprising updating the first route to generate a second route in real-time based upon changes in traffic patterns along the first route.

4. The method of claim 1, comprising updating the first route to generate a second route in real-time based upon changes in weather conditions along the first route.

5. The method of claim 1, comprising:
adding the first objective to a set of secondary objectives to be completed when a second allotment is received.

6. The method of claim 1, comprising:
determining that the second objective is completed before the time allotment expires; and
generating a second route for navigating the user to a third location for completing a third objective based upon determining that the second objective is completed before the time allotment expires.

7. The method of claim 1, comprising:
estimating an amount of time the user will spend completing the first objective and the second objective.

8. The method of claim 1, comprising:
identifying the first objective as an optional objective and the second objective as a mandatory objective.

9. The method of claim 1, the determining comprising:
determining a priority for completing the first objective and the second objective, the second objective having a higher priority than the first objective; and
determining that both the first objective and the second objective cannot be completed within the allotment.

10. The method of claim 9, the priority inferred from one or more past actions of the user.

11. The method of claim 9, the priority not specified by the user.

12. A system comprising:
an analysis component configured to:
receive at least two objectives,
receive an allotment for completing the at least two objectives, the allotment comprising at least one of:
a time allotment for completing the at least two objectives, or
a distance allotment for completing the at least two objectives; and
determine whether both a first objective of the at least two objectives and a second objective of the at least two objectives can be completed within the allotment; and
an assembly component configured to generate a first route for navigating a user to a second location for completing the second objective while not navigating the user to a first location for completing the first objective based upon the analysis component determining that both the first objective and the second objective cannot be completed within the allotment.

13. The system of claim 12, comprising an update component configured to update the first route to generate a second route based upon at least one of changes in traffic patterns along the first route or changes in weather conditions along the first route.

14. The system of claim 12, at least one of the time allotment or the distance allotment taking into consideration at least one of traffic patterns, projected user safety, or weather conditions.

15. The system of claim 12, comprising a transaction component configured to provide an advertisement to the user, the provided advertisement a function of the first route.

16. The system of claim 12, comprising a balance component configured to determine a priority for completing the first objective and the second objective, the assembly component configured to generate the first route based upon a determination that the second objective has a higher priority than the first objective.

17. The system of claim 16, the balance component configured to make inferences about the first objective and the second objective and to determine the priority for completing the first objective and the second objective based upon the inferences.

18. A computer readable storage device, excluding a modulated data signal, comprising computer executable instructions that when executed perform a method, comprising:
receiving at least two objectives;
receiving an allotment for completing the at least two objectives, the allotment comprising at least one of:
a time allotment for completing the at least two objectives, or
a distance allotment for completing the at least two objectives;
determining that a first objective of the at least two objectives cannot be completed within the allotment; and
generating a first route for navigating a user to a second location for completing a second objective of the at least two objectives while not navigating the user to a first location for completing the first objective due to determining that the first objective cannot be completed within the allotment.

19. The computer readable storage device of claim 18, the determining comprising:
determining a priority for completing the first objective and the second objective, the second objective having a higher priority than the first objective; and
determining that both the first objective and the second objective cannot be completed within the allotment.

20. The computer readable storage device of claim 19, the priority inferred from one or more past actions of the user.

* * * * *